United States Patent [19]

Albizzati et al.

[11] Patent Number: 4,472,315
[45] Date of Patent: Sep. 18, 1984

[54] COMPONENTS OF CATALYSTS AND CATALYSTS FOR (CO) POLYMERIZING OLEFINS AND PROCESS FOR PREPARING SAID COMPONENTS, SAID COMPONENTS BEING BASED ON PARTICULAR CHLORINATED COMPOUNDS OF TRIVALENT VANADIUM

[75] Inventors: Enrico Albizzati, Arona; Enzo Giannetti, Novara, both of Italy

[73] Assignee: Montedison S.p.A., Milan, Italy

[21] Appl. No.: 223,851

[22] Filed: Jan. 9, 1981

[30] Foreign Application Priority Data

Jan. 18, 1980 [IT] Italy ................. 19287 A/80
Apr. 17, 1980 [IT] Italy ................. 21433 A/80

[51] Int. Cl.$^3$ .............................. C07F 9/00
[52] U.S. Cl. .................. 260/429 R; 423/492; 526/116; 526/125; 526/169.2; 502/158; 502/171
[58] Field of Search .......... 260/429 R; 252/429 C

[56] References Cited

U.S. PATENT DOCUMENTS

| | | | |
|---|---|---|---|
| 2,994,711 | 8/1961 | Cohen | 260/429 R |
| 3,086,983 | 4/1963 | Cohen | 260/429 R |
| 3,222,333 | 12/1965 | Duck et al. | 260/429 R X |
| 3,413,325 | 11/1968 | Berkheimer | 260/429 R |
| 4,014,911 | 3/1977 | Muntz et al. | 260/429 R |
| 4,014,912 | 3/1977 | Muntz et al. | 260/429 R |
| 4,170,568 | 10/1979 | Kirkwood | 252/429 C X |
| 4,233,182 | 11/1980 | Hoff et al. | 252/429 C |

OTHER PUBLICATIONS

Bradley et al., Metal Alkoxides, Academic Press, N.Y., pp. 7 and 8, (1978).

*Primary Examiner*—Helen M. S. Sneed

[57] ABSTRACT

Components of catalysts for polymerizing olefins having the general formula:

$$VCl_n(OR)_m$$

in which R = a hydrocarbon radical having 1–18 C; or $R_p{}^1Si(OH)_{3-p}$, in which $R^1$ = a hydrocarbon radical, $1 \leq p \leq 3$; $1.5 \leq n \leq 3$, m = 3−n; with X-ray powder spectrum, in which maximum intensity diffraction lines, which in the spectrum of normal $VCl_3$ appear at d = 5.75 Å, d = 2.67 Å and d = 1.74 Å, exhibit a broadening of the half peak breath of at least three times for the diffraction line at d = 5.75 Å and of at least four times for the diffraction lines appearing at d = 2.67 Å and d = 1.74 Å, or said diffraction lines disappear.

6 Claims, No Drawings

COMPONENTS OF CATALYSTS AND CATALYSTS FOR (CO) POLYMERIZING OLEFINS AND PROCESS FOR PREPARING SAID COMPONENTS, SAID COMPONENTS BEING BASED ON PARTICULAR CHLORINATED COMPOUNDS OF TRIVALENT VANADIUM

This invention relates to new components of catalysts for polymerizing alpha-olefins, the catalysts prepared therefrom and the use of same, in particular in the polymerization of ethylene or of mixtures thereof with alpha-olefins $CH_2=CHR$, in which R is an alkyl radical having 1 to 8 C for preparing crystalline copolymers and elastomeric copolymers of ethylene.

BACKGROUND OF THE INVENTION

The polymerization of ethylene is carried out with coordination catalysts of various types, one of the most known being the reaction product of a titanium or vanadium compound with a metallorganic compound of groups I, II and III of the periodic system.

As is known, the use of vanadium catalysts permits to obtain, differently from the Ti catalysts, polyethylene with a rather wide molecular weight distribution (DPM).

From FR Pat. No. 2,378,047 components of catalysts for polymerizing ethylene are known, which are prepared by reacting vanadium halogenated compounds having a valence higher than 3 (for example $VCl_4$, $VOCl_3$) with an aluminium alkyl in the presence of an ether.

The reaction product comprises or essentially consists of $VCl_3$.

The catalysts obtained from said catalyst components by reaction with an aluminium alkyl have a rather high activity, although not so high as to lead to the forming of polymers having a low content of catalyst residues, in particular having residual V contents lower than a few ppm.

In fact it is known that polymers containing V in amounts higher than a few ppm are physiologically prejudicial, wherefore the polymers obtained with said catalyst had to be subjected to long and expensive purification processes.

In the field of elastomeric copolymers the polymerization of ethylene and of alpha-olefins in the presence or in the absence of diolefins has been effected till now with catalysts of different types: one of the most used is composed by the reaction product of a vanadium compound and by a metallorganic compound of the metals of groups I, II and III of the Periodic System.

Said copolymerization is preferably effected by using catalysts which are soluble and highly dispersible in the polymerization medium such as: vanadium halides and oxyhalides, alcoholates and acetylacetonates of vanadium and of vanadyl.

By using these catalysts it is possible to obtain substantially amorphous copolymers, characterized, in the vulcanized state, by precious elastomeric properties. The polymer yields referred to the catalyst employed, however, are not so high as to lead to the forming of polymers having a low content of catalyst residues, in particular having a low content of residual vanadium.

Attempts have been made to obviate this disadvantage by employing activating substances, but also in such case the yields remain always very low and do not permit to avoid purifying the polymer from the catalyst residues.

Therefore the need was felt of having available V catalysts having a high activity and enabling to obtain ethylene polymers containing such percentages of V as to avoid any purification of the polymer, and simultaneously enabling to obtain a polymer with a broad DPM.

THE PRESENT INVENTION

It is an object of the present invention to prepare catalyst components based on V for polymerizing olefins, particularly suited to polymerize ethylene or mixtures thereof with alpha-olefins $CH_2=CHR$, in which R is an alkyl radical having 1–8 C, such catalyst components permitting to obtain crystalline copolymers containing a very low vanadium percentage, so that they may result physiologically harmless and permitting to obtain saturated elastomeric copolymers of ethylene and unsaturated elastomeric copolymers in the case there is also used a hydrocarbon monomer containing more than one double bond, when employed in admixture with aluminium alkyls.

It has been now surprisingly found that chlorinated compounds of trivalent vanadium having certain X-ray powder spectrum can be advantageously used as components of catalysts for the polymerization of olefins and in particular of ethylene or of mixtures thereof with alpha-olefins which mixtures may also contain hydrocarbon monomers with more than one double bond.

By reaction with an Al metallorganic compound and components form catalysts which are very active in the polymerization of ethylene or of mixtures thereof with alpha-olefins $CH_2=CHR$, in which R is an alkyl radical with 1–8 C.

The polymer obtained contains such amounts of catalyst residues as not to require, generally, any purification process.

The catalyst component forming the object of the present invention (component a) includes a vanadium compound having general formula:

$$VCl_n(OR)_m$$

in which:
R = a hydrocarbon radical having 1 to 18 carbon atoms, in particular an alkyl with 1 to 10 carbon atoms, a cycloalkyl with 1 to 10 carbon atoms, an aryl, or a radical $R_p^1Si(OH)_{3-p}$ in which $R^1$ = a hydrocarbon radical and $1 \leq p \leq 3$;
n = a number from 1.5 to 3,
m = 3−n,
with X-ray powder spectrum, in which maximum intensity diffraction lines, that in the spectrum of normal $VCl_3$ appear at d=5.75 Å, d=2.67 Å, and d=1.74 Å, exhibit a broadening of the half peak breath of at least three times for the diffraction line appearing at d=5.75 Å and of at least four times for d=2.67 Å and d=1.74 Å, or said diffraction lines disappear. In the above formula m+n may be slightly different from 3 in view of the possible analytical errors.

By the expression "normal vanadium chloride" we mean $VCl_3$ having a spectrum, on X-ray analysis, reported in ASTM 15-382.

Another object of this invention is a catalyst for polymerizing ethylene or mixtures thereof with alpha-olefins $CH_2=CHR$, in which R is an alkyl radical having 1–8 C, which mixtures may also contain, hydrocarbon monomers with more than one double bond, obtained by reacting catalyst component (a) with (b), a metallorganic compound of Al, preferably Al-trialkyl compound or a compound of Al of general formula:

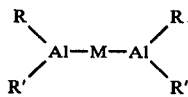

wherein: M=O, S, N—R, P—R,

and R may be a hydrocarbon radical with 1-18 C, in particular an alkyl having 1-20 C, an aryl, and R' may be R or a halogen or an alkoxyl.

Some vanadium compounds representative of the catalytic component are:

$VCl_2(OC_4H_9)$, $VCl_{1.5}(OC_4H_9)_{1.5}$, $VCl_3$,
$VCl_{2.8}(OC_2H_5)_{0.2}$, $VCl_2(OC_6H_5)$,
$VCl_2(OC_8H_{17})$, $VCl_2[OSi(CH_3)_3]$,
$VCl_{1.5}[OSi(CH_3)_3]_{1.5}$.

Component (a) of the catalyst of the invention $VCl_n(OR)_m$ can be prepared according to various methods: one of the preferred methods consists in reacting a chlorinated compound of V with an organic compound containing at least a group —OH in molar excess and in decomposing the resulting reaction product with a compound capable of reacting with the —OH groups of the reaction product, thus providing compounds which are soluble in the reaction medium.

The reaction between the chlorinated compound of V and the organic compound containing —OH groups can occur either in the presence or in the absence of solvents at temperatures ranging from 0° C. to the boiling temperature of the organic compound containing OH groups, employing molar ratios between the organic compound containing OH groups and the V compound comprised between 2 and 300.

The utilizable organic compounds containing at least a group —OH are selected from alcohols and thioalcohols, phenols and thiophenols having 6 to 18 carbon atoms and the silanols $R_p{}^1Si(OH)_{4-p}$, in which $R^1$ has the meaning already specified and $1 \leq p \leq 3$.

Useful alcohols are for example: aliphatic alcohols, cycloaliphatic alcohols, aromatic alcohols, containing 1 to 18 C.

Employable aliphatic alcohols are for example: methyl, ethyl, propyl, butyl, hexyl, octyl alcohols.

Cycloaliphatic alcohols which can be used are: cyclopentanol, cyclohexanol.

Examples of aromatic alcohols are: benzyl alcohol, alpha-phenyl ethyl alcohol.

As phenols it is possible to employ: phenol, cresol and substituted phenols.

Examples of silanols are trimethylsilanol, triphenylsilanol, butyltrisilanol.

The preferred starting V compound is $VCl_3$.

The decomposition of the product obtained from the reaction between the V compound and the organic compound containing a group —OH, can be effected with halogenated compounds of groups III, IV of the periodic system having the characteristics already specified, optionally in the presence of a solvent at temperatures comprised between 30° and 200° C., using a molar excess of the halogenated compound.

Examples of halogenated agents can be the compounds of Si, Sn, Sb, B and Al, Ti, V.

Representative examples of such compounds are, or example, the tetrahalides of Sn or Si, $Cl_2Si(CH_3)_2$, $Cl_3SiCH_3$, $SbCl_3$, $AlCl_3$, $TiCl_4$, $VOCl_3$, the preferred compounds being $SnCl_4$, $SiCl_4$ and $TiCl_4$.

In the case in which the starting vanadium compound has a valence higher than 3, it is possible to employ a halogenated compound in admixture with a reducing agent or a reducing halogenated compound.

Such reducing substances comprise in particular the metallorganic compounds of the metals of groups I, III of the Periodic System, the compounds of Si, Sn and Sb, the halides of Al and B.

Some representative examples are: Al-alkyls, for instance Al-triisobutyl, Al-triethyl, Si-tetraalkyls, the hydrides of Si-alkyls, polyhydrosiloxanes, and moreover $Al(OEt)Et_2$, $Al(i-C_4H_9)_2H$, and still others.

Examples of halogenated and reducing compounds may be: halogen silanes, the halides of Al-alkyls such as $AlR_2Cl$, $AlRCl_2$, $Al_2Et_3Cl_3$, $Al_3Et_3Br_3$, $Al(OEt)EtCl$.

If $SiCl_4$ is utilized as an agent for decomposing the product of the reaction between V compound and the organic compound containing —OH groups, a small amount of Si compound, from 0.5 to 7% by weight as Si, may remain in the product. When for the decomposition $TiCl_4$ is employed as halogenated compound, a product is obtained, in which the OR groups are practically absent and in which a Ti amount varying from 0.5 to 10% by weight is contained.

Representative examples of the Al metallorganic compounds to be employed as components (b) of the catalysts are the following:

$Al(C_2H_5)_3$, $Al(i-C_4H_9)_3$, $Al(C_2H_5)_2Cl$,
$Al_2(C_2H_5)_3Cl_3$, $Al(n-C_3H_7)_2Cl$, $Al(i-C_4H_9)_2H$, $Al(C_8H_{17})_3$,
$Al(C_6H_{13})_3$.

It is preferable to use Al metallorganic compounds containing two or more Al atoms bound to one another by heteroatoms.

Typical examples of such compounds are:

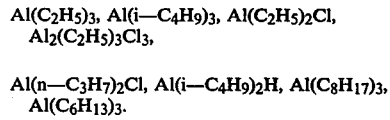

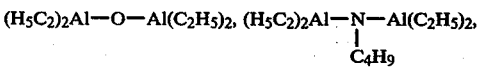

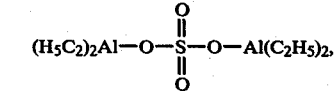

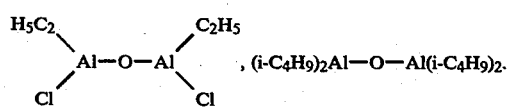

How to prepare these compounds is known from the literature.

The ratio between component (b) and component (a) is higher than 1 and is generally comprised in a wide range, ratios between 5 and 500 being preferably employed.

In case the catalysts are employed to polymerize propylene to form a polymer highly isotactic, it is necessary to modify both component (a) and component (b) with an electron-donor compound as already described in the literature for supported catalysts containing titanium, for example in British Pat. No. 1,559,194.

As a further improvement of the present invention, it has been found that if component (a), obtained by decomposition of the reaction product between the starting V compound and the organic compound containing —OH groups with halogenated compounds different from Ti halogenated compounds, is treated with a liquid halogenated Ti compound under the reaction conditions, catalysts are obtained, which provide very high yields without affecting the DPM.

Examples of Ti compounds to be used are the tetravalent Ti halogenated compounds, such as $TiCl_4$, $TiBr_4$ and Ti halogen-alcoholates.

The reaction with the Ti compound is preferably conducted in an excess of the liquid Ti compound with a successive separation of the unreacted compound. If $TiCl_4$ is utilized as reagent and as reaction medium, the reaction temperature generally ranges from 50° C. to the $TiCl_4$ boiling point, in particular from 80° to 135° C.

The catalyst component of this invention can be supported, according to known techniques, on carriers such as silica, alumina, Mg halides in the activated form, as is described for example in British Pat. No. 1,292,853, or diluted with inert solid substances.

The catalysts obtained therefrom are employed in the (co)polymerization of ethylene and alpha olefins according to known techniques: in the gas phase or in the liquid phase containing, in case, a hydrocarbon solvent.

Examples of solvents are: propane, butane, hexane, heptane and cyclohexane.

For the ethylene polymerization it can be operated at pressures generally below 50 atm. and at temperatures below 150° C., or at pressures above 10 atm. and at temperatures ranging from 150° to 300° C.

Ethylene polymers are obtained having densities higher than 0.95 g/cm$^3$, and crystalline copolymers of same containing up to about 10% by moles of alpha-olefin, having densities ranging from 0.91 and 0.95 g/cm$^3$, endowed with good mechanical characteristics and in particular having a wide molecular weight distribution $$\left( \frac{M_{\overline{w}}}{M_{\overline{n}}} > 10 \right).$$

For obtaining elastomeric copolymers of ethylene as alpha-olefins it is possible to employ propylene, butene-1, 4-methylpentene-1.

As diolefins it is possible to utilize butadiene-1,3, isoprene, hexadiene-1,4, dicyclopentadiene, decatriene-1,4,9, 4vinylcyclohexene, cyclooctadiene-1,5.

The ethylene content in the binary copolymers generally ranges from 20% to 80% by weight.

The third monomer (diene or polyene) content in the unsaturated copolymers ranges from 0.1 to 20% by moles. Copolymerization is carried out according to known tecniques; in particular it is operated in the liquid phase optionally in the presence of an inert hydrocarbon solvent.

It is possible to operate at temperatures lower than 150° C., preferably at temperatures below 60° C.

The polymerization of alpha-olefins (for example propylene) is carried out according to the known techniques described above.

The polymerization temperature ranges from 50° C. to 150° C., preferably from 40° to 90° C.; it is operated at atmospheric pressure or above.

The following examples are given merely for illustrating the present invention, without being however a limitation thereof.

PREPARATION OF CATALYST COMPONENT (A)

EXAMPLES 1–7

Various catalytic components of the catalyst both for the polymerization of ethylene and for the copolymerization of ethylene with alpha-olefins were prepared by operating as follows.

4.07 g of anhydrous $VCl_3$ in powder were dissolved, in a glass vessel equipped with a magnetic stirrer, in a $N_2$ atmosphere, in 50 ml of anhydrous alcohol.

The resulting solution was evaporated to dryness till obtaining a solid product.

The solid product so obtained was decomposed with 200 ml of $SiCl_4$ and it was maintained at reflux for 48 hours.

In example 5, an equimolecular amount of $Cl_3SiCH_3$ instead of $SiCl_4$ was used as decomposing agent of the reaction product between $VCl_3$ and alcohol.

In examples 6 and 7, an equimolecular amount of $TiCl_4$ (double treatment at 130° C. for 2 hours) was used instead of $SiCl_4$. The resulting violet solid was isolated by filtration, it was repeatedly washed with portions of 50 cc each of anhydrous n-heptane, finally it was dried under vacuum (at 0.5 mm Hg) for at least 1 hour at 20° C.

In all the examples the final product obtained was essentially a violet solid compound in powder having general formula $VCl_n(OR)_m$, wherein n and m vary from 1.5 to 3, the extremes being included, and containing variable amounts of Si or Ti, depending on the reagents used.

The spectra, on X-ray analysis, of the products of examples 6, 7 exhibited a broadening of the half peak breath of the lines of maximum intensity which in the powder spectrum of normal $VCl_3$ appear at: d=5.75 Å, d=2.67 Å and d=1.74 Å.

The spectra, on X-ray analysis, of the products of examples 1 to 5 were characterized in that they did not show the lines of maximum intensity which in the spectrum of normal—$VCl_3$ appear at the above-mentioned values.

EXAMPLE 8

5.3 g of the catalyst component prepared as in examples 1 to 5 were treated with 100 ml of $TiCl_4$ at 130° C. for 2 hours. $TiCl_4$ was removed by filtering at 130° C. and an equal amount thereof was added, it was allowed to react at the same temperature for 2 hours, whereupon it was filtered at 130° C. to remove $TiCl_4$ and it was washed at 90° C. with n-heptane until disappearance of the chlorine ions in the filtrate.

The elementary analysis of the solid product dried under vacuum is reported on Table I.

The spectrum, on X-ray analysis, is of the type of examples 6–7.

TABLE I

Preparation of catalyst component (a)
$VCl_n(OR)_m$

Analysis of the component

| Example No. | ROH | V (% by weight) | Cl (% by weight) | OR (% by weight) | Ti (% by weight) |
|---|---|---|---|---|---|
| 1 | $C_2H_5OH$ | 23.75 | 43.3 | 13.0 | — |
| 2 | $CH_3OH$ | 26.7 | 46.2 | 5.42 | — |
| 3 | $C_4H_9OH$ | 25.2 | 42.0 | 29.2 | — |
| 4 | $C_8H_{17}OH$ | 22.4 | 37.1 | 28.6 | — |
| 5 | $C_2H_5OH$ | 25.44 | 41.7 | 14.94 | — |
| 6 | $C_2H_5OH$ | 18.1 | 58.8 | — | 9.62 |
| 7 | $C_4H_9OH$ | 22.0 | 59.6 | — | 8.9 |
| 8 | $C_2H_5OH$ | 15.95 | 50.3 | — | 5.56 |

EXAMPLE 9

3.5 g of anhydrous $MgCl_2$ in powder and 8.1 g of anhydrous $VCl_3$ in powder were dissolved in 150 ml of anhydrous $C_2H_5OH$ at room temperature in a vessel equipped with a magnetic stirrer. The resulting solution was evaporated to dryness until obtainment of a green solid product.

The solid product so obtained was treated with 200 ml of $TiCl_4$. The temperature was then brought to 110° C. and maintained at such level for 2 hours.

The resulting violet solid was isolated by filtration and it was treated again with 400 cc of $TiCl_4$ for 2 hours at a temperature of 135° C. It was washed with n-heptane until disappearance of the chlorine ions in the filtrate.

The elementary analysis of the dried solid is reported on Table II.

EXAMPLE 10

Example 9 was repeated using 7.8 g of $VCl_3$, 3.4 g of $MgCl_2$ and 100 ml of $C_2H_5OH$ respectively.

The solid product obtained by means of the process according to example 9 was treated at reflux with 200 ml of $SiCl_4$ for 48 hours. It was filtered and the resulting solid product was repeatedly washed with n-heptane.

The elementary analysis of the solid obtained is reported on Table II.

TABLE II

Analysis of the component

| Example No. | V % by weight | Cl % by weight | Ti % by weight | Si % by weight | Mg % by weight |
|---|---|---|---|---|---|
| 9 | 15 | 54.2 | 7.2 | — | 5.2 |
| 10 | 15.7 | 45.5 | — | 7.9 | 4.0 |

POLYMERIZATION OF ETHYLENE

EXAMPLES 11–32

The catalyst components prepared in examples 1 to 10 mixed with Al-alkyls formed the catalysts which were utilized in the polymerization of ethylene.

Polymerization was carried out under the following conditions: 100 ml of anhydrous desulphurized and deaerated n-heptane, component (b) as co-catalyst and finally a proper amount of component (a) were introduced in the order into a 3-liter autoclave equipped with an anchor stirrer and heated at the desired temperature. Hydrogen and ethylene at the prefixed partial pressures were added and the total pressure was kept constant for the duration of polymerization by continuously feeding ethylene.

Polymerization was stopped after a proper reaction period, the suspension was discharged from the autoclave, it was filtered and the polyethylene was dried in an oven to constant weight.

The amounts of the components used, conditions and temperature at which polymerization was conducted and the physical properties of the polymer obtained are recorded on Table III.

The polymer melt index was measured according to standards ASTM D 1238 (conditions E and F) and is expressed in g/10 min.

TABLE III

| Example No. | Catalyst component Example No. | Co-catalyst aluminum alkyl | conc. (mm/l) | Polymerization conditions T (°C.) | pH$_2$ (atm.) | pC$_2$H$_4$ (atm.) | t (h) | Polymer yield (Kg PE/g cat.) | $\eta$inh (dl/g) | Melt index (g/10') MI E | MI F | $\frac{M_{\bar{w}}}{M_{\bar{n}}}$ |
|---|---|---|---|---|---|---|---|---|---|---|---|---|
| 11 | 1 | $Al(iC_4H_9)_3$ | 1 | 85 | 1 | 12 | 4 | 17 | 1.61 | 1.39 | 81 | 10.96 |
| 12 | 1 | $Al(iC_4H_9)_3$ | 1 | 70 | 1.5 | 11.5 | 4 | 15 | 2.02 | 0.47 | 36.9 | 11.42 |
| 13 | 1 | $Al(nC_6H_{13})_3$ | 1 | 70 | 1.5 | 11.5 | 4 | 13 | 1.99 | 0.41 | 60.4 | 16.52 |
| 14 | 1 | $(C_2H_5)_2AlOCH_3$ | 2.5 | 70 | 2 | 11 | 4 | 15.3 | 1.67 | 1.8 | 122.2 | 22.32 |
| 15 | 1 | $(C_2H_5)_2AlOCH_3$ | 2.5 | 85 | 1 | 12 | 4 | 18.2 | 1.73 | 1.6 | 86.9 | 13.4 |
| 16 | 1 | $[(iC_4H_9)_2Al]_2O$ | 4 | 85 | 1 | 12 | 2 | 47.5 | 2.25 | 0.34 | 24.6 | 13.94 |
| 17 | 1 | $[(iC_4H_9)_2Al]_2O$ | 4 | 75 | 2 | 11 | 2 | 30 | 1.43 | 2.17 | 156 | 21.38 |
| 18 | 1 | $[(nC_6H_{13})_2Al]_2O$ | 4 | 75 | 2 | 11 | 2 | 22 | 1.52 | 2.8 | 166 | 16.35 |
| 19 | 2 | $[(iC_4H_9)_2Al]_2O$ | 4 | 85 | 1.5 | 11.5 | 2 | 24 | 2.66 | 0.14 | 12.3 | 20.12 |
| 20 | 3 | $Al(iC_4H_9)_3$ | 1 | 85 | 1 | 12 | 4 | 12.8 | 2.12 | 0.44 | 26.4 | 15.03 |
| 21 | 3 | $[(iC_4H_9)_2Al]O$ | 4 | 85 | 1 | 12 | 4 | 36 | 2.96 | 0.043 | 4 | 15.41 |
| 22 | 4 | $[(iC_4H_9)_2Al]_2O$ | 4 | 85 | 1.5 | 11.5 | 2 | 41 | 2.44 | 0.25 | 15.3 | 12.66 |
| 23 | 5 | $Al(iC_4H_9)_3$ | 1 | 85 | 1 | 12 | 4 | 16 | 2.03 | 0.41 | 31.3 | 12.01 |
| 24 | 1 | $[(iC_4H_9)_2Al]NC_4H_9$ | 4 | 85 | 1.5 | 11.5 | 2 | 26.7 | 2.06 | 0.47 | 33.3 | 12.46 |
| 25 | 1 | $[(C_2H_5)_2Al]SO_4$ | 4 | 85 | 1.5 | 11.5 | 2 | 52.4 | 1.94 | 0.64 | 42.1 | 21.01 |
| 26 | 8 | $[(C_4H_9)_2Al]_2O$ | 4 | 85 | 6 | 8 | 2 | 42.7 | 2.15 | 0.54 | 20.7 | 12.1 |
| 27 | 8 | $[Al(iC_4H_9)_3]$ | 4 | 85 | 6 | 8 | 2 | 33.4 | 2.30 | 0.26 | 13 | 16.3 |
| 28 | 8 | $[Al(C_6H_{13})_3]$ | 1.5 | 70 | 8 | 6 | 4 | 12.5 | 3.29 | 0.1 | 6.23 | 19.53 |
| 29 | 6 | $Al(C_6H_{13})_3$ | 1.5 | 85 | 7 | 7 | 1 | 50 | 1.95 | 0.58 | 37.2 | 18.66 |
| 30 | 7 | $Al(iC_4H_9)_3$ | 5 | 70 | 7 | 7 | 2 | 23.6 | 2.86 | 0.04 | 6.40 | 14.67 |
| 31 | 9 | $Al(iC_4H_9)_3$ | 5 | 70 | 7 | 7 | 1 | 18.8 | 2.08 | 0.5 | 28.7 | 11.59 |
| 32 | 10 | $Al(C_6H_{13})_3$ | 3 | 70 | 7 | 7 | 3 | 29.4 | 1.98 | 0.76 | 28.7 | 23.31 |

COPOLYMERIZATION OF ETHYLENE

EXAMPLES 33–35

The catalyst components prepared in examples 1 to 10 mixed with Al-alkyls formed the catalysts which were employed in the copolymerization of ethylene with minor amounts of alpha-olefins for obtaining crystalline copolymers of ethylene.

Copolymerization was carried out under the following conditions: a 3-liter autoclave equipped with an anchor stirrer and heated at the desired temperature was fed in the order with: 480 ml of anhydrous desulphurized deaerated n-heptane, 4 m moles of $(iC_4H_9)_2Al-O-Al(iC_4H_9)_2$ as co-catalyst, a suitable amount of butene-1, the desired amount of $H_2$, and ethylene up to a total pressure of 14 atm. After 5 minutes, 10 mg of the solid catalytic component (a) described in example 1 suspended in 20 ml of n-heptane were introduced under an argon overpressure, the total pressure having been maintained constant by continuously feeding ethylene. After 10 minutes the test was stopped and the polymer was isolated after having removed the unreacted monomers.

The amount of butene-1, the polymerization conditions and the physical characteristics of the copolymers obtained are reported on Table IV.

TABLE IV

| | | | | Copolymerization of ethylene | | | | |
|---|---|---|---|---|---|---|---|---|
| | | Polymerization conditions | | | Polymer | | | |
| Example No. | Butene-1 (g) | T (°C.) | pH$_2$ (atm.) | polymer g | C$_4$ (% b.w.) | d (g/cm$^3$) | melt point (°C.) | $\eta$inh. (dl/g) |
| 33 | 20 | 70 | 1 | 90 | 3.5 | 0.946 | 126 | 1.29 |
| 34 | 40 | 70 | 0.5 | 105 | 5.1 | 0.925 | 122.5 | 2.15 |
| 35 | 20 | 85 | 0.5 | 122 | 3.7 | 0.938 | 124.5 | 2.03 |

EXAMPLE 36

A 1.5-liter autoclave equipped with an anchor stirrer and at room temperature was fed in the order with: 0.7 g of $[(iC_4H_9)_2Al]_2O$ in n-heptane solution containing 134 g/l, and 415 g of butene-1.

It was heated at the temperature of 65° C. (butene-1 pressure==7.5 atm.) and hydrogen was added up to a pressure of 9.5 atm., and then ethylene up to a pressure of 36 atm. 7.7 mg of the catalyst component obtained according to the example 1 to 20 cc of n-pentane were then introduced by means of a steel syringe under an ethylene overpressure. Ethylene was added up to a pressure of 39 atm. (ethylene pressure=29.5 atm.).

During the test the pressure was kept constant by feeding ethylene.

The test was stopped after 2 hours and after having removed the unreacted monomers, the polymer was isolated and dried in an oven at 70° C. to constant weight.

The amount of polymer was 220 g.

The yield was of 120,000 g/g of V (28,600 g/g of catalyst).

The copolymer showed at infrared spectrographic analysis a butene content of 10.5% by weight.

The density was of 0.9166 g/cm$^3$, $\eta$inh of 1.6 dl/g, M.I.$_E$=1.75 g/10' and M.I.$_F$=180 g/10'.

ELASTOMERIC COPOLYMERS OF ETHYLENE

EXAMPLE 37

22 mg of the catalyst component obtained, according the example 1, mixed with 1 cc of $Al(iC_4H_9)_3$ in 20 cc of n-heptane, constituted the catalyst for the polymerization.

500 g of propylene were introduced, at room temperature, into an autoclave having a capacity of 3,000 cm$^3$, equipped with an anchor stirrer; the temperature was brought to 40° C. (propylene pressure=16 atm.) and ethylene was added up to a pressure of 22 atm. The catalyst was then introduced by means of a steel syringe under an argon overpressure. During the test the pressure was kept constant by feeding ethylene. The test was stopped after 4 hours.

The amount of polymer dried under vacuum was of 150 g.

The yield was of 28,000 g/g of V (6,800 g/g of catalyst).

The copolymer, subjected to infrared spectrographic analysis, showed a propylene content of 39% by weight.

On X-ray analysis the copolymer exhibited a crystallinity of the polyethylene type of 2% by weight.

EXAMPLE 38

500 g of propylene were introduced, at room temperature, into the autoclave described in example 37. The temperature was brought to 40° C. (propylene pressure=16 atm.) and ethylene was introduced up to a total pressure of 22 atm. Successively, 21 mg of the catalyst component prepared according to example 37, mixed with 8 cc of a 0.5M solution of $(iC_4H_9)_2Al-O-Al(iC_4H_9)_2$ in 20 cc of n-heptane, were introduced by means of a steel syringe under an argon overpressure.

During the test the pressure was maintained constant by feeding ethylene. Polymerization was stopped after 4 hours. The polymer dried under vacuum amounted to 160 g. The yield was of 31,000 g/g of V (7,600 g/g of catalyst).

Under infrared spectrographic analysis the copolymer revealed a propylene content of 45% by weight. Under X-rays analysis the copolymer exhibited the presence of crystallinity of the polyethylene type of 3% by weight.

PROPYLENE POLYMERIZATION

EXAMPLE 39

8 g of anhydrous $VCl_3$ in powder were dissolved in 100 ml of anhydrous $C_2H_5OH$ in the vessel described above. The resulting solution was evaporated till obtaining a solid product.

7.81 g of the solid product so obtained were added to 200 ml of $SiCl_4$ and 8.8 m moles of ethyl benzoate (EB) in heptane solution. It was maintained at reflux for 48 hours and then the resulting solid was isolated by filtration, washed with portions of 50 cc each of anhydrous n-heptane and dried under vacuum for 1 hour at 20° C.

4.77 g of the solid product so obtained was treated with 200 ml of $TiCl_4$ and a heptane solution containing 2.2 m moli of EB. It was heated to 120° C. and kept at such temperature for two hours. It was filtered and an equal amount of TiCl₄ was added again, it was allowed to react at the same temperature for two hours, whereupon it was filtered to remove TiCl₄ and washed at 90° with n-heptane until disappearance of chlorine ions in the filtrate. The solid dried under vacuum exhibited on analysis the following contents by weight:

Ti=4.4%, V=24.2%, Cl=59.9%, EB=1.57%.

Propylene polymerization was carried out under the following conditions: 3.75 m moles of an aluminium trialkyls mixture, having the following composition of the gases (% by volume) after hydrolysis:

ethane=9 isobutane=49.4 n-butane=41.2 propane=0.16 isobutane=0.24 were reacted at room temperature with 1.13 m moli of methylpara-toluate in 80 ml of n-heptane (anhydrous and desulphurized) for 5 minutes.

50 ml of such solution were contacted with a 120 mg of the catalyst component prepared above.

The remaining 30 ml were diluted to 1,000 ml with n-heptane and introduced, under a nitrogen pressure, into a steel autoclave, having a capacity of 3,000 ml, equipped with anchor magnetic stirrer and thermometer, thermoregulated at 40° C., into which propylene was made to flow.

In the same way, the catalytic component suspension was then introduced into the autoclave. After closing of the autoclave, hydrogen was added up to a partial pressure of 0.1 atm., then it was heated to 70° C. under simultaneous feeding of propylene up to a total pressure of 7 atmospheres. Such pressure was kept constant throughout the polymerization by going on feeding the monomer. After 4 hours polymerization was stopped and polypropylene was isolated by treatment with methanol and acetone.

The results of the polymerization were: yield=2.33 Kg of polymer/g of catalyst, heptane residue of the extraction with boiling n-heptane was 91.3, ηinh=3.87.

What we claim is:

1. Components of catalysts for polymerizing olefins, comprising a chlorinated compound of trivalent vanadium of general formula:

VCl$_n$(OR)$_m$ wherein:

R=a hydrocarbon radical having 1 to 18 carbon atoms, in particular an alkyl with 1 to 10 carbon atoms, a cycloalkyl with 6 to 8 carbon atoms, an aryl or radical R$_p^1$Si(OH)$_{3-p}$ in which R$^1$ is a hydrocarbon radical and $1 \leq p \leq 3$, n=a number from 1.5 to 3 m=3−n;

with X-ray powder spectrum, in which the maximum intensity diffraction lines, which in the spectrum of normal VCl₃ appear at d=5.75 Å, d=2.67 Å and d=1.74 Å, exhibit a broadening of the half peak breath of at least three times for the diffraction line at d=5.75 Å and of at least four times for the diffraction lines appearing at d=2.67 Å and d=1.74 Å, or said diffraction lines disappear.

2. Catalyst components according to claim 1, in which n=2, m=1 and R is an alkyl radical having 1 to 8 carbon atoms.

3. A catalyst component according to claims 1 or 2 having the formula:

VCl₂(OC₂H₅).

4. A process for preparing catalyst components in which a chlorinated compound of trivalent vanadium is reacted with a molar excess of an organic compound containing at least one —OH group and which is selected from the group consisting of alcohols, phenols having from 6 to 18 carbon atoms and the silanols R′$_p$Si(OH)$_{3-p}$ in which R′ is a hydrocarbon radical and $1 \leq p \leq 3$ and the resulting reaction product is decomposed with a halogenating substance capable of reacting with the —OH groups present in the solid reaction product, said halogenating substance being selected from the group consisting of halides of tetravalent Si and Ti, trihalides of Al and B, and halides of Sn and Sb.

5. A process according to claim 4 in which VCl₃ is used as V compound, C₂H₅OH as organic compound containing —OH groups, and the decomposition is effected with SiCl₄.

6. Process for preparing a catalyst component in which a chlorinated compound of vanadium in which the valence of the vanadium is higher than 3, is reacted with a molar excess of an organic compound containing at least one —OH group and selected from the group consisting of alcohols, phenols having 6 to 18 carbon atoms, and the silanols R′$_p$Si(OH)$_{3-p}$ in which R′ is a hydrocarbon radical and $1 \leq p \leq 3$ and the resulting reaction product is decomposed with a halogenating substance capable of reacting with the —OH groups present in the solid reaction product and selected from the group consisting of halides of tetravalent Si and Ti, trihalides of Al and B, and halides of Sn and Sb, and with a reducing substance selected from the group consisting of organometallic compounds of metals of Group I-III of the Mendelyeev Periodic Table and organometallic compounds of Si, Sn and Sb.

* * * * *